(12) United States Patent
Saxena et al.

(10) Patent No.: US 12,380,459 B2
(45) Date of Patent: Aug. 5, 2025

(54) METHOD AND SYSTEM FOR DRIVING ZERO TIME TO INSIGHT AND NUDGE BASED ACTION IN DATA-DRIVEN DECISION MAKING

(71) Applicant: Genpact USA, Inc., New York, NY (US)

(72) Inventors: Vivek Saxena, Gurgaon (IN); Kathryn Stein, New York, NY (US); Lavi Sharma, Gurgaon (IN); Vikram Jha, Sealdah (IN)

(73) Assignee: Genpact USA, Inc., New York, NY (US)

( * ) Notice: Subject to any disclaimer, the term of this patent is extended or adjusted under 35 U.S.C. 154(b) by 33 days.

(21) Appl. No.: 17/749,658

(22) Filed: May 20, 2022

(65) Prior Publication Data

US 2023/0419346 A1 Dec. 28, 2023

(51) Int. Cl.
  *G06Q 30/0203* (2023.01)
  *G06Q 30/0201* (2023.01)
  *G06Q 30/0204* (2023.01)
  *G06N 20/00* (2019.01)

(52) U.S. Cl.
  CPC ..... *G06Q 30/0203* (2013.01); *G06Q 30/0204* (2013.01); *G06Q 30/0206* (2013.01); *G06N 20/00* (2019.01)

(58) Field of Classification Search
  CPC .......... G06G 10/0203; G06G 10/0204; G06G 10/0206; G06N 7/01
  See application file for complete search history.

(56) References Cited

U.S. PATENT DOCUMENTS

| | | | |
|---|---|---|---|
| 7,330,841 B2 | 2/2008 | Cochran et al. | |
| 8,069,073 B2 | 11/2011 | Shapiro et al. | |
| 11,074,598 B1* | 7/2021 | Kumar | G06Q 30/0202 |
| 2017/0109627 A1 | 4/2017 | Sherwin et al. | |
| 2021/0248512 A1* | 8/2021 | Calabrese | G06N 5/025 |

* cited by examiner

*Primary Examiner* — Dylan C White
(74) *Attorney, Agent, or Firm* — Goodwin Procter LLP

(57) ABSTRACT

A method for driving zero time-to-insight and effectiveness of insight-to-nudge in a decision-making process. The method includes identifying a scope associated with a data-to-action loop in the decision-making process. The method further includes determining, by a zero time-to-insight engine, a zero time-to-insight quotient for a data-to-insight loop included in the data-to-action loop. The method additionally includes determining, by an insight-to-nudge engine, an insight-to-nudge quotient for an insight-to-action loop included in the data-to-action loop. The method additionally includes determining, by a predictive model factor component, a data-to-action prediction model factor (D2A PMF) for the data-to-action loop, where the D2A PMF quantifies an incremental zero time-to-insight potential for the data-to-action loop and corresponding attributes. The method additionally includes generating a nudge quotient for the data-to-action loop based on the zero time-to-insight quotient, the insight-to-nudge quotient, and the D2A PMF.

18 Claims, 8 Drawing Sheets

| Trailing | Evolving | Maturing | Leading |
|---|---|---|---|
| Delayed and inaccurate availability of structured data | Full timely access to internal and structured data sets | Full timely access to internal and structured data sets however access to unstructured & external data is limited | All data sets whether internal or external, structured or unstructured are available for use |

FIG. 4A

| Trailing | Evolving | Maturing | Leading |
|---|---|---|---|
| Finance has delayed access to all known-known & known unknown data set through | Finance has full access to all known-known & known unknown data set through | Finance has complete access to all known-known & known unknown data set | Finance has complete & timely access to all data set expect unknown-unknown |

FIG. 4B

| Trailing | Evolving | Maturing | Leading |
|---|---|---|---|
| Non availability of sufficient historical data to identify trends / patterns | Limited availability of historical & testing data to identify trends / patterns | Availability of training and testing data with no or limited mechanism to capture feedback | Formal mechanism to capture and close loop feedback on utilization of insight exist |

FIG. 4C

| Trailing | Evolving | Maturing | Leading |
|---|---|---|---|
| Data regulation make access to right data extremely difficult | Data required for decision making is moderately impacted by data privacy restrictions | Most data required for decision making is not impacted by data privacy restrictions | Enterprise have developed ways to work around with data restricted by privacy laws |

FIG. 4D

| Trailing | Evolving | Maturing | Leading |
|---|---|---|---|
| There is no mechanism to track or eliminate data biases - impacts are unaccounted | Data bias check is mostly manual and lacks consistency | Process (like Information governance council) is in place to protect data biases | Bias elimination is integrated in all processes and there is universal confidence in data and resulting insights |

FIG. 4E

METHOD AND SYSTEM FOR DRIVING ZERO TIME TO INSIGHT AND NUDGE BASED ACTION IN DATA-DRIVEN DECISION MAKING

TECHNICAL FIELD

The disclosure generally relates to artificial intelligence-based decision-making processes and, more particularly, to methods and systems for achieving real-time data-driven actions through monitoring and improving enterprise decision-making processes.

BACKGROUND

Current decision-making processes in organizations are generally non-standardized, individual-driven, and unchecked. For example, current attempts at determining decisions based on data input and determining actions based on the decisions involve combinations of intuition, individual biases, or probabilistic assessments. In addition, the models used by organizations have either limited or nonexistent governance frameworks to assess or fix accountability for actions based on insights captured/provided. For example, to measure insights out of input data, the existing decision-making models mainly determine forecast accuracy, time to report, % of time spent on data gathering, etc. The feedback loop of actions (e.g., how many actions have been taken based on the obtained insights) is either not calculated or highly informal. In other words, there is no formal structure in these models to measure or evaluate the decisions (e.g., insights) derived from the data and actions driven by the insights. Instead, most organizations depend on individual preferences, feedback, and indirect reflection on growth and revenue to assess decision-making performance.

Therefore, there is a need for a decision-making monitoring process that provides an accurate assessment of the likely conversion of data into insights that drive actions, to improve a decision-making process so that more valuable, unbiased, structured and timely actions can be driven out of the data.

SUMMARY

To address the aforementioned shortcomings, a predictive data-to-action system and method for driving zero time-to-insight and effectiveness of insight-to-nudge are provided. The method includes identifying a scope associated with a data-to-action loop in the decision-making process. The method further includes determining, by a zero time-to-insight engine, a zero time-to-insight quotient for a data-to-insight loop included in the data-to-action loop. The method additionally includes determining, by an insight-to-nudge engine, an insight-to-nudge quotient for an insight-to-action loop included in the data-to-action loop. The method additionally includes determining, by a predictive model factor component, a data-to-action prediction model factor (D2A PMF) for the data-to-action loop, where the D2A PMF quantifies an incremental zero time-to-insight potential for the data-to-action loop and corresponding attributes. The method additionally includes generating a nudge quotient for the data-to-action loop based on the zero time-to-insight quotient, the insight-to-nudge quotient, and the D2A PMF.

The foregoing is a summary and thus contains, by necessity, simplifications, generalizations and omissions of detail; consequently, the summary is illustrative only and is not limiting in any way. Other aspects, inventive features, and advantages of the systems and/or processes described herein will become apparent in the non-limiting detailed description set forth herein.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIGS. 4A-4E illustrate exemplary maturity levels for different data components of the data-to-insight loop, according to some embodiments.

DETAILED DESCRIPTION

Figure 1:
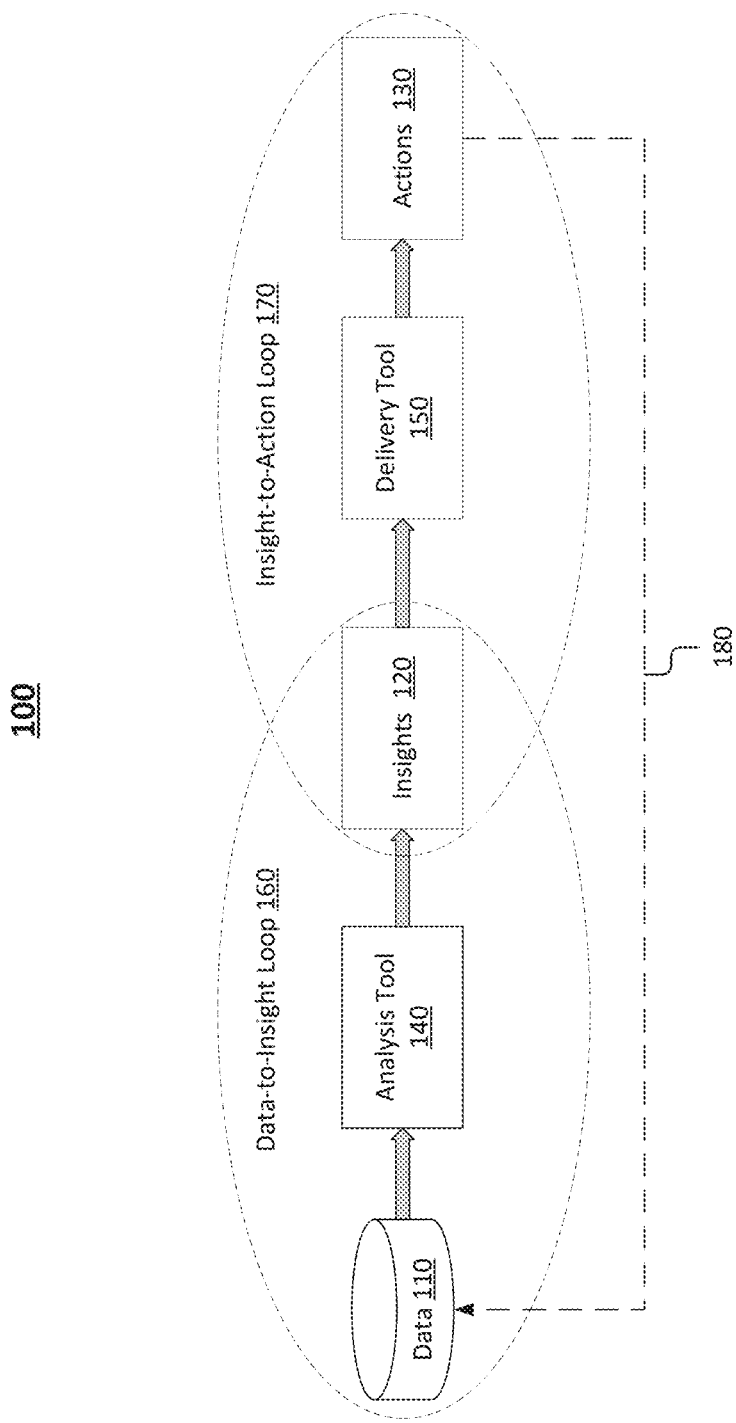
FIG. 1 illustrates an exemplary data-driven decision-making process, according to some embodiments.

In the following detailed description of embodiments, reference is made to the accompanying drawings which form a part hereof, and which are shown by way of illustrations. It is to be understood that features of various described embodiments may be combined, other embodiments may be utilized, and structural changes may be made without departing from the spirit and scope of the present disclosure. It is also to be understood that features of the various embodiments and examples herein can be combined, exchanged, or removed without departing from the spirit and scope of the present disclosure.

In accordance with various embodiments, the methods and functions described herein may be implemented as one or more software programs running on a computer processor or controller. In accordance with various embodiments, the methods and functions described herein may be implemented as one or more software programs running on a computing device, such as a tablet computer, smartphone, personal computer, server, or any other computing device. Dedicated hardware implementations including, but not limited to, application-specific integrated circuits, programmable logic arrays, and other hardware devices can likewise be constructed to implement the methods and functions described herein. Further, the methods described herein may be implemented as a device, such as a non-transitory computer-readable storage medium or memory device, including instructions that when executed cause a processor to perform the methods described herein.

In accordance with various embodiments, the methods and functions described herein, when implemented as software programs, provide an effective technical solution that actively monitors and/or further improves decision-making processes (e.g., data-to-action loop), to address technical problems of existing decision-making models that are highly non-standardized, individual driven, unchecked, and "one-and-done".

According to some embodiments, a decision-making evaluating and monitoring system described herein actively evaluates and monitors input data used in a decision-making process. That is, instead of passively making decisions based on whatever available data, the decision-making evaluation and monitoring system disclosed herein may actively evaluate (e.g., through machine learning-based classifier) and monitor (e.g., through data filtering or adaptive data collection processes) data maturity for the input data used in a decision-making process, so that insights and further actions derived from the input data can be evaluated without prejudice. In addition, through continuously monitoring data maturity of the data used in the decision-making process, it can be ensured that data with higher maturity levels be used in the current decision-making processes if they are available, or data with higher maturity levels be collected in the future, to improve the decision-making processes.

As used herein and as further described in detail below, data maturity can be measured from different aspects, such as data type, data availability, data advancement, data privacy, data bias, etc. In addition, data maturity may be classified into a spectrum of maturity levels with different maturity. According to one example, data maturity may be classified into trailing, evolving, maturing, and leading levels with the trailing level being the most novice level and the leading level being the best level or highest level of outcome. The higher the maturity levels of the input data, the more accurate/effective insights derived from the input data through the data-to-insight loop.

According to some embodiments, the disclosed decision-making evaluation and monitoring system also evaluates and monitors the insight-to-action loop, to ensure that the insights are timely delivered to relevant parties and noise (e.g., variations) is eliminated in a decision-making process. The monitoring of the insight-to-action loop may be also achieved by measuring the maturity levels of the loop from different aspects (e.g., type of insights, personalization and bias), similar to the evaluation of the data-to-insight loop. Through consistently monitoring the insight-to-action loop, the objective of the disclosed decision-making evaluation and monitoring system is also to achieve higher maturity levels from the insight delivery aspect and from the noise elimination aspect, to allow relevant insights to be timely delivered to a target entity in a consumable manner.

According to some embodiments, the disclosed decision-making evaluation and monitoring system additionally incorporates a D2A predictive model factor (D2A PMF) when monitoring or evaluating the decision-making process (or the data-to-action loop). The D2A PMF is a factor that reflects the extent to which zero data-to-action can be achieved within the given constraints of attributes. For example, for a company or a department in the company, a D2A PMF value may indicate how far from achieving a zero data-to-action (that is, effective and relevant insights instantly derived from input data and timely delivered to drive instant actions) under the idealistic decision-making environment (e.g., based on currently available data, current data collection procedure, current prediction models for pattern identification, current decision-making procedure, etc.). By considering the D2A PMF during the monitoring or evaluation of a decision-making process, it can provide a direct clue for the performance of the current decision-making process and how much additional effort is expected to achieve a zero data-to-action cycle for a company or a department with the given constraints of attributes.

According to some embodiments, by evaluating and monitoring the data-to-insight loop and the insight-to-action loop and by taking the D2A PMF into the consideration to evaluate a decision-making process, the disclosed decision-making evaluation and monitoring system provides a more accurate assessment of the likely conversion of data into insights that drive actions. In addition, the system can be also used to fix decision accountability, ensure data-driven actions rather than intuitions, monitor the quality of insights derived from the data, improve overall decision-making processes over time, etc.

From the above descriptions and further descriptions below, the solution disclosed herein shows technical improvements when compared to other existing decision-making models. Through the incorporation of machine learning-based models or other artificial intelligence technologies, the solution disclosed herein allows an accurate assessment (e.g., certain quantitative measurements) of each segment of a decision-making process. For instance, the decision-making evaluation and monitoring system described herein can evaluate the maturity of the data used in decision-making processes using certain machine learning models. These machine learning models, once trained and tested, can provide accurate and qualitative or quantitative measurements of the maturity of the data used in decision-making processes. In addition, machine learning models can be also used to qualitatively and/or quantitatively measure the maturity of the insight-to-action processes. Through machine learning-based qualitative and quantitative monitoring of different segments involved in decision-making processes, the whole decision-making process can be effectively monitored, which then allows to assess or fix accountability for actions based on generated insights, and further improve the decision-making processes based on the assessment. In addition, through the inclusion of the machine learning-based predictive model factor in monitoring the decision-making process, the solution disclosed herein can accurately determine how far the current decision-making processes are from achieving zero data-to-actions (e.g., instantly and timely drive effective actions from input data without delay). This then provides guidelines for improving the data-driven decision-making processes, resulting in the improved performance of the decision-making models or systems.

It is to be understood that the benefits and advantages described herein are not all-inclusive, and many additional features and advantages will be apparent to one of ordinary skill in the art in view of the figures and the following descriptions.

FIG. 1 illustrates an exemplary decision-making process 100, according to some embodiments. As illustrated, the exemplary decision-making process 100 starts with data 110, which can be data previously collected and is now available to generate or derive certain insights 120 for making decisions. The data can be in various formats, such as structured, unstructured, or a mixture of both. The data can be locally stored or cloud-based and can be accessible to certain people in an organization (e.g., a company, a department inside a company). Once collected, the data can be further updated and reused after the update. In addition, data stored in storage can be further organized into different datasets that can be used for different purposes. This includes the organization of data according to different departments of a company, or organization of data according to different serving purposes, etc.

The insights 120 can be any useful information that is identified from the data 110 through certain analysis tools 140. For example, the data 110 can be fed into a prediction model with algorithms to identify certain patterns, which can be recapitulated as insights derived from the data 110. In another example, the data 110 can be also fed into a machine learning model for generating insights out of the data. There are many different tools 140 that allow different insights to be generated from the data 110. Accordingly, based on the objective of a decision-making process, different analytical tools 140 may be used to generate insights from different perspectives. In some embodiments, a process of generating insights from data may be also referred to as a data-to-insight loop 160 in a decision-making process, as illustrated in FIG. 1.

In some embodiments, the data 110 can be also evaluated for maturity with respect to a decision-making process, as further described in detail in FIGS. 2-6C. For example, when the data 110 is input into the analysis tool 140 for generating the insight, the data 110 can be also evaluated for its quality in terms of its use in the decision-making process (e.g., is there enough data? is data in a format ready for analysis? is data too old? etc.). It is to be understood that, in some embodiments, data maturity is a measurement of how advanced a company's data analysis is. A high level of data maturity is the stage reached when data has woven its way deep into the fabric of an organization and when data has become incorporated in almost every decision that an organization makes. Accordingly, in some embodiments, measurement of the data maturity is not just a measurement of the quality of the data used in making decisions, but may also include a measurement of how data is properly used in the decision-making processes (e.g., what kind of data should be used in the decision-making process).

As described above, insights 120 can be derived from the data 110 towards different objectives. In some embodiments, the insights 120 may be just used to support the point of view. However, for a truly data-driven organization, insights 120 can be used to drive certain actions 130 to be taken, which allows a continuous zero time-to-insight-to-action cycle to maintain. For example, the actions 130 driven by the insights 120 may in turn affect the data collection process, and thus affect (as shown by dotted line 180) the data 110 to be used in the later decision-making processes. In some embodiments, to allow the insights 120 to drive proper actions 130 to be taken, the insights 120 need to be delivered through a delivery tool 150 to a certain action unit, module, or component in a system that implements certain actions based on the insights delivered. The insight delivery tool 150 may control the delivery of the insights 150 to relevant parties in time so that proper action can be timely taken. In some embodiments, the delivery of insights to drive actions in the decision-making process is also referred to as the insight-to-action loop, as also illustrated in FIG. 1. In some embodiments, the insight-to-action loop can be also elevated for maturity with respect to a decision-making process, as further described in detail below.

Figure 2:
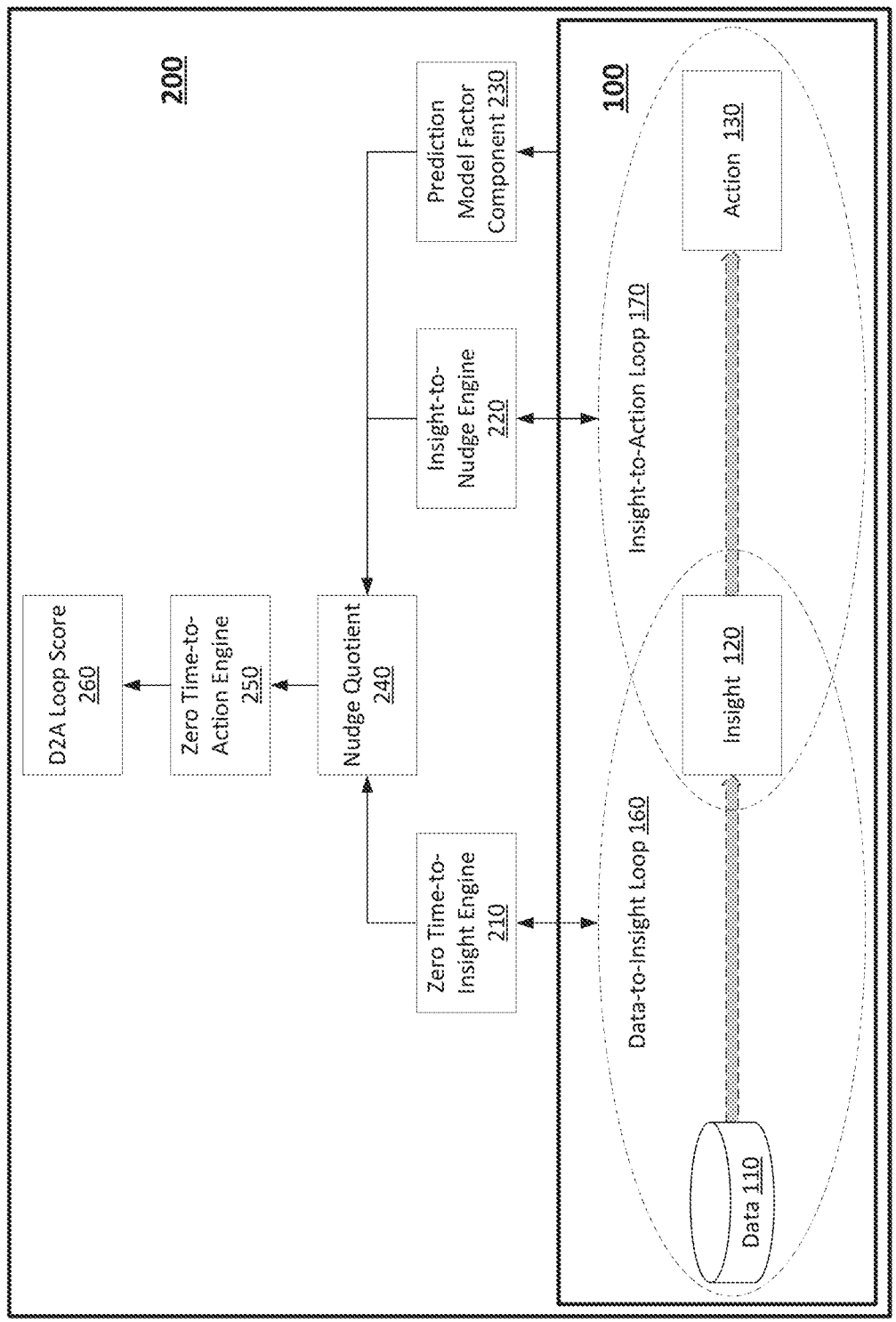
FIG. 2 illustrates an exemplary data-driven decision-making evaluation and monitoring system, according to some embodiments.

FIG. 2 illustrates an exemplary data-driven decision-making evaluation and monitoring system 200, according to some embodiments. As illustrated, the decision-making evaluation and monitoring system 200 includes a zero time-to-insight engine 210 configured to monitor and/or optimize the data-to-insight loop 160 in the decision-making process, an insight-to-nudge engine 220 configured to monitor and/or optimize the insight-to-action loop 170 in the decision-making process. According to one embodiment, each of the zero time-to-insight engine 210 and the insight-to-nudge engine 220 may be configured to measure the maturity of the data-to-insight loop and the maturity of the insight-to-action loop, respectively. The measured maturity values of the two loops can be used to calculate a nudge quotient 240, which can be further input into a zero data-to-action engine 250 that is configured to monitor the whole data-to-action process or the whole data-to-action loop in a decision-making process. For example, the zero data-to-action engine 250 may use an algorithm to calculate a D2A loop score 260 for the whole data-to-action loop.

As described earlier, in some embodiments, the calculation of the nudge quotient 240 may also take into consideration of a D2A PMF factor. Accordingly, the disclosed decision-making evaluation and monitoring system 200 may additionally include a prediction model factor component 230 that is configured to determine the D2A PMF value for the data-to-action loop. The determined D2A PMF value may be also input into an algorithm used to calculate the nudge quotient. The specific functions of the disclosed zero time-to-insight engine 210, insight-to-nudge engine 220, zero data-to-action engine 250, and the prediction model factor component 230 are further described in detail with reference to FIGS. 3-7.

Figure 3:
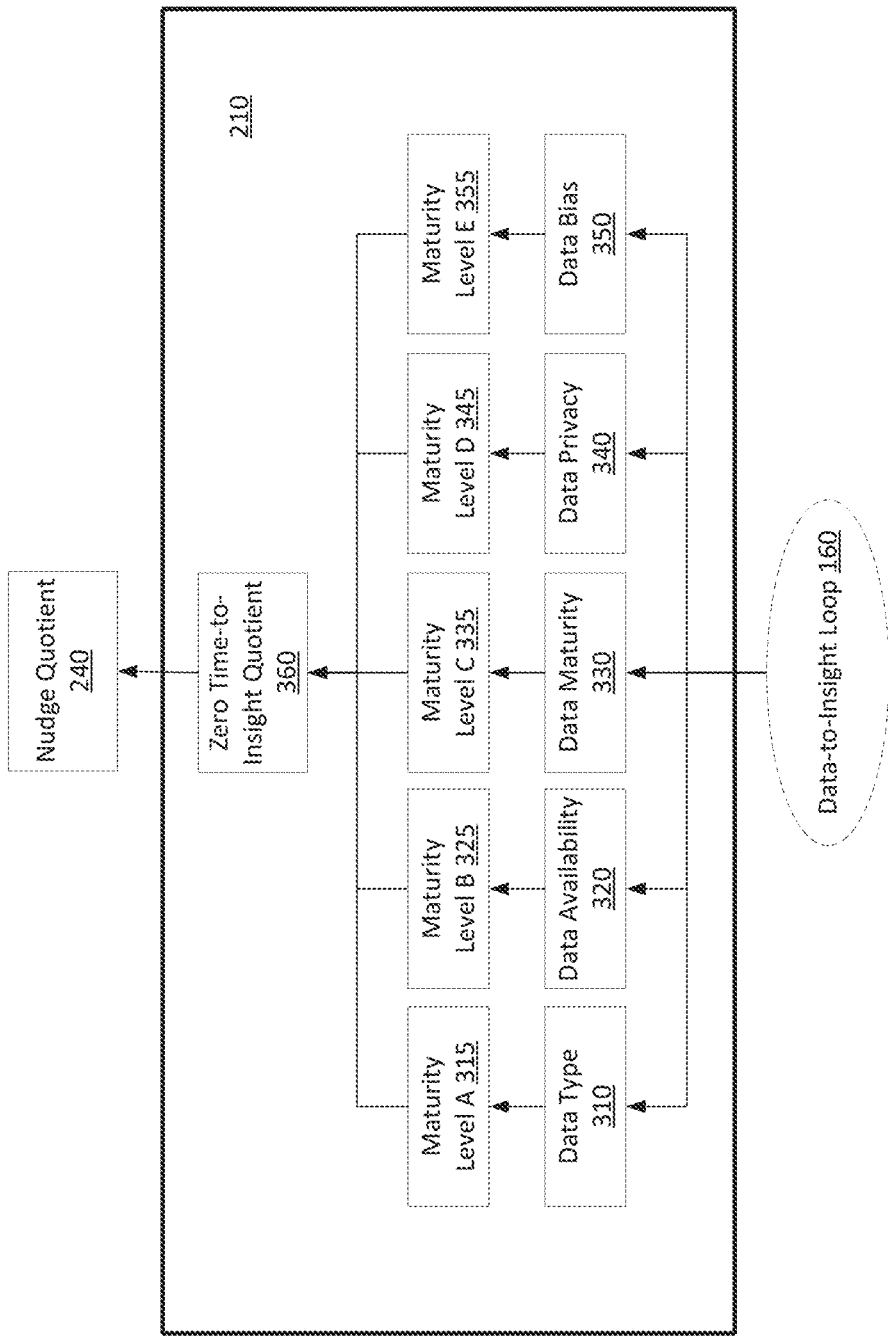
FIG. 3 illustrates an exemplary operation of a zero time-to-insight engine that measures maturity of the data-to-insight loop, according to some embodiments.

FIG. 3 illustrates an exemplary operation of zero time-to-insight engine 210 that measures the maturity of the data-to-insight loop, according to some embodiments. As described earlier, the maturity level of the data (also referred to as the maturity level of the data-to-insight loop) for a company is a measurement of how advanced a company's data analysis is. Different companies may be at different stages of experimenting with data and realizing what kinds of decisions can be made via deep analysis. Some are just realizing that they need to combine all of their data sources into one place, while others are running advanced queries in Python or preparing data for predictive machine learning models. That is, there are significant disparities in data maturity between otherwise similar organizations. These disparities in data maturity clearly affect decisions made by organizations looking to make long-term plans. Accordingly, establishing an eloquent approach to measuring the data maturity for a company may allow a company to set up a bar for improved management. By implementing such an approach, the data maturity of a company can be consistently monitored and improved through additional efforts based on the measured data maturity. Through continuous efforts, the data maturity of a company may eventually reach a level that allows insights to be made and actions to be driven without additional waiting for data collection in the process of achieving a zero data-to-action cycle.

According to one embodiment illustrated in FIG. 3, the maturity of the data 110 may be evaluated from, but not limited to, data type 310, data availability 320, data maturity 330, data privacy 340, and data bias 350 (each may be also referred to as "evaluator" or "data components") aspects. Each evaluator or data component is measured on a spectrum of maturity levels, which may range from trialing level to leading level according to one embodiment. After evaluation, the data 100 may get a corresponding maturity value and/or maturity level (e.g., maturity level A 315, maturity level B 325, maturity level C 335, maturity level D 345, and maturity level E 355) for each evaluator or data component 310-350.

As also illustrated in FIG. 3, after degerming the corresponding maturity levels for the data from different evaluators or data components 310-350, the zero time-to-insight engine 210 can further determine a zero time-to-insight quotient 360 (a value for measuring the data maturity) for the data 110 used in making decisions. The determined zero time-to-insight quotient 360 can then be used for generating a nudge quotient for evaluating the performance of a decision-making process.

With respect to the evaluator data type 310, the zero time-to-insight engine 210 may measure the maturity level (e.g., maturity level A) of the data 110 from the data structure and data residence aspects. The data structure indicates whether the data 110 is structured, unstructured, or semi-structured, and the data residence indicates whether the data is internal or external. For data that is structured, data generally resides in predefined formats and models, while unstructured data is stored in its natural format until it's extracted for analysis. Semi-structured data basically is a mix of both structured and unstructured data. Structured data is considered more traditionally as business intelligence because it's quantifiable. It's easier to put in a database, search, and analyze. All the old-school data is in a structured form, so people can put it in the database, apply algorithms, and get value from it much quicker. Conversely, unstructured data is considered a newer type of data. It's not pre-defined and typically contains text-heavy information, such as that from social networks or customer comments. Newer types of data are more difficult to use because that data isn't in a user-friendly form. Tapping into this newer type of data provide competitive advantages, as it allows organizations to unearth new insights.

Internal data refers to information generated from within an organization (e.g., a company or a department within a company), covering areas such as operations, maintenance, personnel, and finance, while external data comes from the market, including customers and competitors. The external data includes, but is not limited to, statistics from surveys, questionnaires, research, and customer feedback. Generally, the best results are achieved when both internal and external data are read together in correlation.

As illustrated in FIG. 4A, to measure the maturity level of the data 110 based on the data structure and data residence, the zero time-to-insight engine 210 may classify the data 110 into four different maturity levels, including trailing, evolving, maturing, and leading levels. According to one embodiment, when the maturity of the data 110 (or the action-to-insight loop 160 itself) is classified into the trailing level, it means that there is only delayed and inaccurate availability of structured data to be used in a decision-making process. When the data 110 or the action-to-insight loop 160 is classified into the evolving level, it means that there is full timely access to internal and structured datasets for decision-making, while there is no external or unstructured data available for decision-making. When the data 110 or the data-to-insight loop 160 is classified into the maturing level, it means that there is full timely access to internal and structured datasets for decision-making. While there may be certain external or unstructured data available, access to the unstructured and external data is limited. When the data 110 or the data-to-insight loop 160 is classified into the leading level, it means that there is full timely access to different types of data, whether structured or unstructured, internal or external.

In some embodiments, a certain maturity value or score may be further provided based on the data type evaluation of the data 110 or the data-to-insight loop 160. For instance, if the data 110 or the data-to-insight loop 160 falls into the trialing level, a value between 1-25 may be provided for the identified data type. Similarly, if the data 110 or the data-to-insight loop 160 falls into the evolving level, a value between 26-50 may be provided for the identified data type, if the data 110 or the data-to-insight loop 160 falls into the maturing level, a value between 51-75 may be provided for the identified data type, and if the data 110 or the data-to-insight loop 160 falls into the leading level, a value between 76-100 may be provided for the identified data type.

It is to be understood that the classification of the data 110 or the data-to-insight loop 160 into four different maturity levels and the assignment of the corresponding value ranges for these maturity levels are for interpretation purposes, and not for limitation. The maturity levels of the structure and residence-based data type may be classified into three levels, five levels, six levels, seven levels, and the like, and the corresponding value ranges may also vary (e.g., 0-10, 10-20, 20-30, 30-40, etc.). In some embodiments, the zero time-to-insight engine 210 may directly determine a maturity value or score regarding the maturity of the data from the data type aspect without necessarily classifying the data 110 or the data-to-insight loop 160 into a specific maturity level.

In some embodiments, the zero time-to-insight engine 210 may include certain rules or algorithms for determining a specific maturity score or value for the identified data type. For example, the zero time-to-insight engine 210 may have a rule or algorithm to define a value according to the length of delay when evaluating the delayed and inaccurate data availability of structured data falling into the trialing level. If only a month earlier data is available, the rule may assign a value of 5 for the data available for making decisions. However, if a week earlier data can be available, the rule may assign a value of 15 instead, and if the data of a couple of days earlier is available, the rule may assign a value of 20 for the data falling into the trialing level. In some embodiments, the zero time-to-insight engine 210 may obtain metadata information for the obtained data 110, to determine the delayed length of the available data and then assign a value based on the predefined rule or algorithm. In another example, if the data 110 or the data-to-insight loop 160 is classified into the leading level, the zero time-to-insight engine 210 may have another different rule to define a value between 76-100 based on the percentage of internal data used in a decision-making process. A higher percentage of internal data, a higher maturity score or value within 76-100.

In some embodiments, the maturity score or value determined as above may be further adjusted based on certain other information related to the data (e.g., data accuracy). For instance, the same predefined rule or algorithm (or another different rule or algorithm) may be used to adjust the assigned value based on the accuracy of the structured data. If the data available one week ago has certain missing information or has certain obvious errors (e.g., certain numbers are placed into the user name information), then the assigned value of 15 may be further adjusted, e.g., decreased to 10.

In some embodiments, instead of relying on predefined rules or algorithms, the zero time-to-insight engine 210 may further include a machine learning model that is trained to automatically assign a value between 1-100. The machine learning-based model may be trained using a large number of datasets with labeled values with respect to the data type, and thus can be used to determine a maturity score or value for data (e.g., data 110) input into the model. The maturity score or value determined by the machine learning model may fall between 0-25 according to one example, which indicates that the data used in decision-making is at the trialing level.

In some embodiments, the machine learning model may instead be trained to classify the data into different maturity levels without being assigned a maturity score or value regarding the data type. A specific value within the determined maturity level range may be then determined based on the predefined rules with or without human intervention. In some embodiments, additional means for determining the maturity level and/or maturity score of data 110 or the data-to-insight loop 160 are possible and contemplated in the disclosure.

Referring back to FIG. 3, the data 110 or the data-to-insight loop 160 is also measured for the maturity level (e.g., maturity level B 325) from the data availability aspect. To measure the data availability, the zero time-to-insight engine 210 may divide the situation of data for decision making into four different categories: known-known, known-unknown, unknown-known, and unknown-unknow. When classifying data into known-known, it indicates a situation where there is data that is understood and is also available for use in a decision-making process. When classifying data into known-unknown, it indicates a situation where there is data that is known to exist but can't be interpreted much when used in a decision-making process. When classifying data into unknown-known, it indicates a situation where there is data for which the data impact is understood but is currently unavailable for a decision-making process. When classifying data into unknown-unknown, it indicates a situation where there is data that is not understood nor it is available for use in a decision-making process. It is to be understood that when dividing data into the above four categories, the data may be limited to data that is relevant to decision-making. Accordingly, when the data 110 used in decision making is in different categories, the accuracy of made decisions and thus the effectiveness of the driven actions are also different.

Referring to FIG. 4B, the maturity level of the data 110 or the data-to-insight loop 160 is also measured from the availability aspect. Similar to the above-discussed maturity levels classified from the data type aspect, the maturity level of the data availability can be also measured at four different levels, that is, the trialing level, the evolving level, the maturing level, and the leading level. In the embodiment illustrated in FIG. 4B, when the data 110 or the data-to-insight loop 160 is classified into the trailing level, it means that there is only delayed access to all known-known & known-unknown datasets to be used in a decision-making process. When the data 110 or the data-to-insight loop 160 is classified into the evolving level, it means that there is full access to all known-known & known-unknown datasets to be used in a decision-making process. When the data 110 or the data-to-insight loop 160 is classified into the maturing level, it means that there is complete access to all known-known & known-unknown datasets to be used in a decision-making process, but there is limited data access to unknown-known datasets. When the data 110 or the data-to-insight loop 160 is classified into the leading level, it means that there is complete and timely access to all datasets except that unknown-unknow datasets.

In some embodiments, similar to the above-described maturity measurement of the data type, the measurement of the data availability-related maturity can be also determined by using certain predefined rules or algorithms or using certain machine learning models trained to determine the maturity from the data availability aspect. According to one embodiment, the zero time-to-insight engine 210 may have a predefined rule or algorithm that compares the objective of a decision-making process with the currently available data, to determine at which maturity level the data used for decision-making currently is. In one example, the objective of a decision-making process is to determine an annual salary increase for a company, and the expected data used to make the decision may include the financial performance of the company, how many employees the company currently has, how many new employees that the company plans to hire in the next year, etc. The predefined rule or algorithm may classify the data availability into different levels (and/or assign a specific value) based on what data is currently available for making the decision.

To determine the data availability-related maturity using the machine learning models, a machine learning model similar to or different from the above-described machine learning model for determining the data type-related maturity can be used. The model may be trained using data that has been labeled with already known data availability and with the marked maturity level and/or specific data availability-related maturity score or value. Once trained, the machine learning model may be used to determine the data availability-related maturity level and/or assign a maturity value or score for the data from the data availability aspect.

Referring back to FIG. 3, the data 110 or the data-to-insight loop 160 is also measured for the maturity level (e.g., maturity level C 335) from the data advancement aspect. When discussing data advancement, it means the availability of three data types that feed into prediction models used in a decision-making process. The three data types include the historic data (or training data), the present data (or the testing data), and the feedback data (or the specific feedback from the prediction models).

Referring to FIG. 4C, the maturity level of the data 110 or the data-to-insight loop 160 is also measured from the data advancement aspect. The maturity level of the data availability can be also measured at four different levels. In the embodiment illustrated in FIG. 4C, when the data 110 or the data-to-insight loop 160 is classified into the trailing level, it means that there is insufficient historical data to identify trends/patterns in a decision-making process. When the data 110 or the data-to-insight loop 160 is classified into the evolving level, it means that there is limited historical & testing data to identify trends/patterns in a decision-making process. When the data 110 or the data-to-insight loop 160 is classified into the maturing level, it means that there is available training and testing data but there is no or limited mechanism to capture feedback. When the data 110 or the data-to-insight loop 160 is classified into the leading level, it means that there exists a formal mechanism in current data to capture and close loop feedback on the utilization of insights.

In some embodiments, similar to the above-described measurement of the data type-related maturity, the measurement of the data advancement can be also determined by using certain predefined rules or algorithms or using certain machine learning models trained to determine the data advancement-related maturity. In one example, the zero time-to-insight engine 210 may have a predefined rule or algorithm that compares the current number of datasets with the data requirement of a prediction model used to identify trends and patterns, to determine the maturity level and/or specific value within a predefined range (e.g., 1-100). In some embodiments, a machine learning model may be used to determine the maturity level or a specific maturity value or score for the data 110 or the data-to-insight loop 160 from the data advancement aspect, similar to the above-described approaches for determining the maturity from the data type and data availability aspects.

Referring back to FIG. 3, the data 110 is also measured for the maturity level (e.g., maturity level D 345) from the data privacy aspect. When discussing data privacy, it means the limited or delayed data access caused by the privacy concerns from the governments, regulatory authorities, businesses, end consumers, or any other entity.

Referring to FIG. 4D, the maturity level of the data 110 is also measured from the data privacy aspect. The maturity level of data privacy can be also measured at four different levels. In the embodiment illustrated in FIG. 4D, when the data 110 or the data-to-insight loop 160 is classified into the trailing level, it means that data regulation makes access to the right data used in a decision-making process extremely difficult. When the data 110 or the data-to-insight loop 160 is classified into the evolving level, it means that data required for decision-making is moderately impacted by the data privacy restrictions. When the data 110 or the data-to-insight loop 160 is classified into the maturing level, it means that most data required for decision making is not impacted by data privacy concerns. When the data 110 or the data-to-insight loop 160 is classified at the leading level, it means that enterprises have developed strategies to work around the data restricted by privacy laws.

The measurement of the data privacy can be also determined by using certain predefined rules or algorithms or using certain machine learning models trained to determine the data privacy-related maturity. In one example, the zero time-to-insight engine 210 may have a predefined rule or algorithm that compares the data required for making the decision with the relevant restrictions or privacy laws, to determine the maturity level and/or specific value within a predefined range (e.g., 1-100). In some embodiments, a machine learning model may be also used to determine the maturity level or a specific maturity value for the data 110 or the data-to-insight loop 160 from the data privacy aspect.

Referring back to FIG. 3, the data 110 is additionally measured for the maturity level (e.g., maturity level E 355) from the data bias aspect. Organizations are pivoting to more data-driven decision-making, rather than individual experience-based for which they rely on datasets. But like human judgment, all data collected also has inbuilt biases. The concerns have aggravated since the uprise of prediction models that feed on data. The prediction models inherit the bias of the data and thus may produce undesired outcomes. For example, a recruiting machine learning system for a company may be biased against women, racial discrimination in face recognition technology, etc.

Referring to FIG. 4E, the maturity level of the data 110 or the data-to-insight loop 160 is also measured from the data bias aspect. In the embodiment illustrated in FIG. 4E, when the data 110 or the data-to-insight loop 160 is classified into the trailing level, it means that there is no mechanism to track or eliminate data bias in decision-making. That is, impacts from data bias are unaccounted for in a decision-making process. When the data 110 or the data-to-insight loop 160 is classified into the evolving level, it means that the data bias check is mostly manual and thus lacks consistency. When the data 110 or the data-to-insight loop 160 is classified into the maturing level, it means that there are certain protocols (e.g., standards set up by the information governance council) in place to protect against data bias in a decision-making process. When the data 110 or the data-to-insight loop 160 is classified into the leading level, it means that bias elimination is integrated into all processes and there is universal confidence in data and resulting insights.

In some embodiments, the measurement of the data bias-related maturity can be also determined by using certain predefined rules, algorithms, or using certain machine learning models trained to determine the maturity level from the data bias aspect. In one example, the zero time-to-insight engine 210 may check the existence of certain bias elimination mechanisms along the data processing path when preparing for data used in decision making, and assign a corresponding value (e.g., a value within a range of 1-25, 26-50, 51-75, or 76-100) and/or determine a specific maturity level based on the degree of the integration of bias elimination mechanisms. In some embodiments, a machine learning model may be also used to determine the maturity level or a specific maturity value for the data 110 or the data-to-insight loop 160 from the data bias aspect.

It is to be understood that the above-descried evaluators or data components 310-350 are not exclusive. In actual applications, there may be additional evaluators or data components that may affect the insights derived from the input data in decision making, which are also considered in the disclosure. These additional evaluators or data components may be also evaluated for maturity and assigned with certain maturity scores and/or maturity levels that can be applied to later zero time-to-insight quotient calculation. In addition, certain data components 310-350 (e.g., data advancement) described above may be not necessarily used in measuring the maturity of the data 110 or the data-to-action loop 160.

It is also to be understood that the functions of the zero time-to-insight engine 210 are not limited to the above-described measurements of the data maturity from different aspects. The functions of the zero time-to-insight engine 210 may additionally include providing directions to certain data collection tools or components for incoming data collection (e.g., when, where, and/or what data are to be collected) and to certain data processing and/or analysis tools to develop strategies (e.g., to work around data restricted by privacy laws), so as to improve the data maturity to a level to allow achieving a zero data-to-action cycle in a decision-making process. According to one example, if the zero time-to-insight engine 210 has detected that the data availability-related maturity is at the evolving level, the zero time-to-insight engine 210 may send the instructions to data collection tools located in the marketing department for preparing or providing survey or questionnaire to collect specific external data, to improve the data maturity from the data availability aspect. In another example, if the zero time-to-insight engine 210 has detected the data privacy-related maturity is at the evolving level, the zero time-to-insight engine 210 may send the instructions to relevant data processing and/or analysis tools to process data without breaking privacy laws by taking additional tactics. It is to be understood that the above examples are for illustrative purposes and not for limitation. In real applications, the zero time-to-insight engine 210 may generate additional instructions as necessary and may include additional functions that facilitate the data maturity for data used in a decision-making process.

In some embodiments, after determining the maturity values of the data 110 or the data-to-insight loop 160 from each of the aforementioned aspects, a specific function may be used to evaluate the data-to-insight loop during the monitoring or evaluating of the decision-making process. According to one embodiment, a function for such evaluation may be a multiplier of maturity measurements of data type, data availability, and data advancement constrained by the data privacy and data bias, as shown in the equation below:

$$\text{Zero Time-to-Insight Quotient} = d * \left( \frac{\text{Type} * \text{Availability} * \text{Maturity}}{\text{Privacy} * \text{Bias}} \right)$$

This value may be referred to as the zero time-to-insight quotient 360. The higher the value, the better quality of the data 110 or the data-to-insight loop 160 in a decision-making process. The numerator has a directly proportionate and positive relationship on the data 110 or the loop 160, while the denominator has an inverse relationship. As also illustrated in FIG. 3, the determined zero time-to-insight quotient 360 can be further used for calculating the eventual nudge quotient, as described in detail later. In some embodiments, if the determined zero time-to-insight quotient 360 is below a certain threshold, an ongoing decision-making process can be timely terminated due to the low quality of the data used in the decision-making process. This then saves the computation resources of a decision-making device or system.

As described earlier, besides the evaluation and monitoring of the decision-making process from the input data or the data-to-insight loop, the disclosed decision-making evaluation and monitoring system 200 also evaluates or monitors the insight-to-action loop 170 to determine whether the insights derived from the input data can be timely delivered to drive instant actions.

Figure 5:
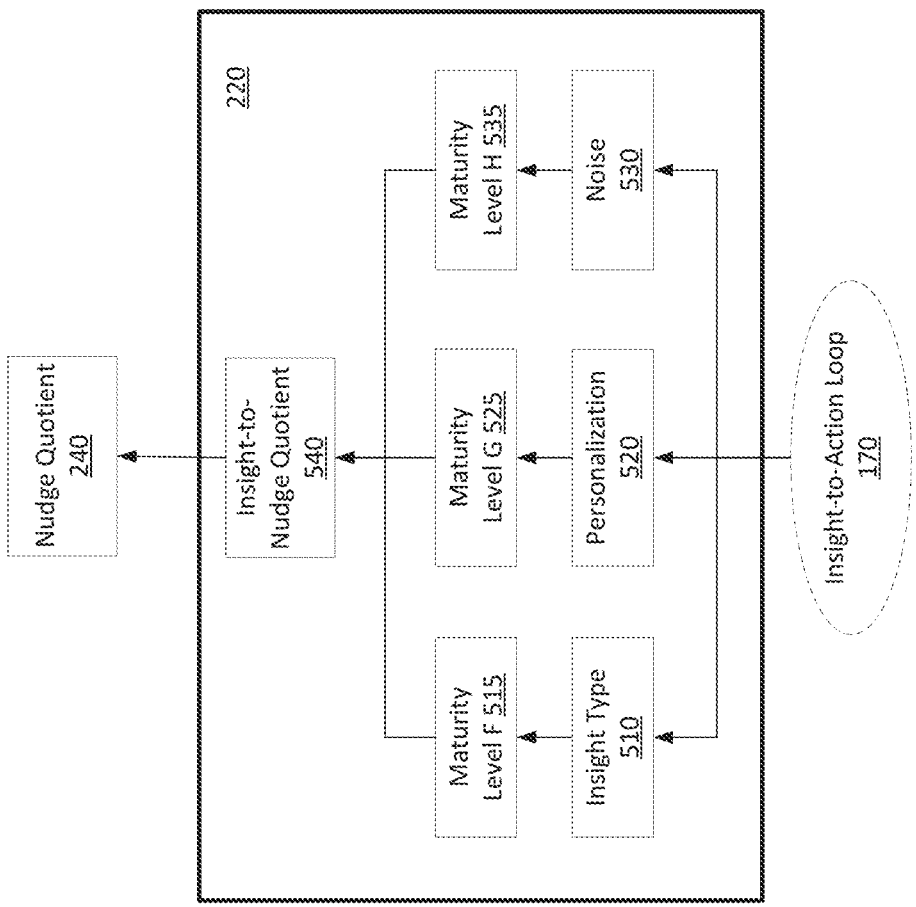
FIG. 5 illustrates an exemplary operation of an insight-to-nudge engine that measures maturity of the insight-to-action loop, according to some embodiments.

FIG. 5 illustrates an exemplary operation of insight-to-nudge engine 220 that measures the maturity of the insight-to-action loop, according to some embodiments. Insights are generally accurate and helpful if the maturity of the input data 110 or the data-to-insight loop 160 is at a high level and the prediction models used in the decision-making function as expected. However, without action, the insights derived from the input data 110 are just facts and figures. While some managers and executives of an organization may search for insights that support their point of view, to be truly data-driven, the zero time-to-insight-to-action cycle needs to be continuous, so that data consistently gets enriched, more context appears, and the cycles begin again. Through this continuous effort, the maturity of the input data can be continuously improved, and the goal of a zero data-to-action cycle can be achieved at a department level or a whole company level.

As illustrated in FIG. 5, the effectiveness of insights in driving actions can be evaluated from the insight type 510 aspect, personalization 520 aspect, and from the noise 530 aspect. Insight type in evaluating the insight-to-action loop 170 specifically refers to the type of insights derived from the data-to-insight loop, which may include, but are not limited to, descriptive, diagnostic, predictive, prescriptive and cognitive insights, each of which answers different questions, as will be described later in FIG. 6A. Personalization in evaluating the insight-to-action loop 170 specifically refers to "a process that creates a relevant, individualized interaction between two parties designed to enhance the experience of the recipient." Simply put, personalization is the act of tailoring an experience or communication for an individual. Personalized nudges based on past trends drive action. With respect to the insight-to-action loop 170, personalization specifically refers to the mode of delivery of insights and the relevance of the insight delivered, as will be described later in FIG. 6B. Noise in evaluating the insight-to-action loop 170 specifically refers to systematic variation that occurred in a decision-making process.

As also illustrated in FIG. 5, the insight type 510, personalization 520 and noise 530 surrounding the insight-to-action loop 170 can be also evaluated or measured using the above-described maturity level scheme for data-to-insight loop evaluation. For example, after evaluation, the insight-to-action loop 170 may also get certain maturity values or maturity levels from the insight type, personalization and noise aspects (e.g., maturity level F 515, maturity level G 525 and maturity level H 535 for the corresponding evaluators or data components 510, 520 and 530).

Figure 6A:
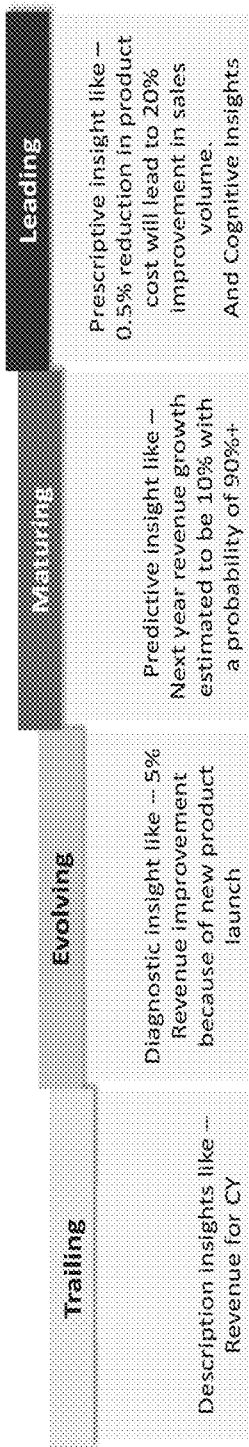
FIGS. 6A-6C illustrate exemplary maturity levels for different data components of the insight-to-action loop, according to some embodiments.

Referring to FIG. 6A, the maturity level of the insight-to-action loop 170 is first measured from the insight type aspect. In the embodiment illustrated in FIG. 6A, when the type of an insight is classified into the trailing level, it means that the insight is a description-like insight or descriptive insight. That is, the insight may tell what has happened (e.g., there is a 5% revenue increase) based on the data analysis. When the type of an insight is classified into the evolving level, it means that the insight is a diagnosis-like insight or diagnostic insight. That is, the insight takes the descriptive insight a step deeper to answer the question from the data: why did this happen? For example, a 5% revenue increase is found to relate to a new product launch. When the type of an insight is classified into the maturing level, it means that the insight is a prediction-like insight or predictive insight. That is, the insight predicts what will happen next based on the available data. For example, an insight may predict next year's revenue to increase 10% with a probability of 90%. When the type of an insight is classified into the leading level, it means that the insight is a prescriptive insight, which takes a predictive insight to a next level to determine certain actions to take based on the prediction or certain cause for a prediction. According to one example, a prescriptive insight may be a prediction of a 20% increase in sales caused by a 0.5% reduction in cost. In some embodiments, an insight classified into the leading level may be also a cognitive insight, which means that the insight may be drawn out of certain cognitive activities (e.g., re-evaluation of certain ideas through artificial intelligence).

In some embodiments, similar to the above-described measurements of the data maturity from different aspects, the measurement of the insight type-related maturity level can be also determined by using certain predefined rules, algorithms, or using certain machine learning models trained to determine the maturity level of the data-to-insight loop 170 from the insight type aspect. In one example, the insight-to-nudge engine 220 may have a predefined rule or algorithm that checks the content of an insight (e.g., through computer-implemented semantic analysis), to determine the maturity level and/or specific value within a predefined range (e.g., 1-100). In some embodiments, a machine learning model may be also used to determine the maturity level or a specific maturity value or score for the insight-to-action loop 170 from the insight type aspect.

Figure 6B:
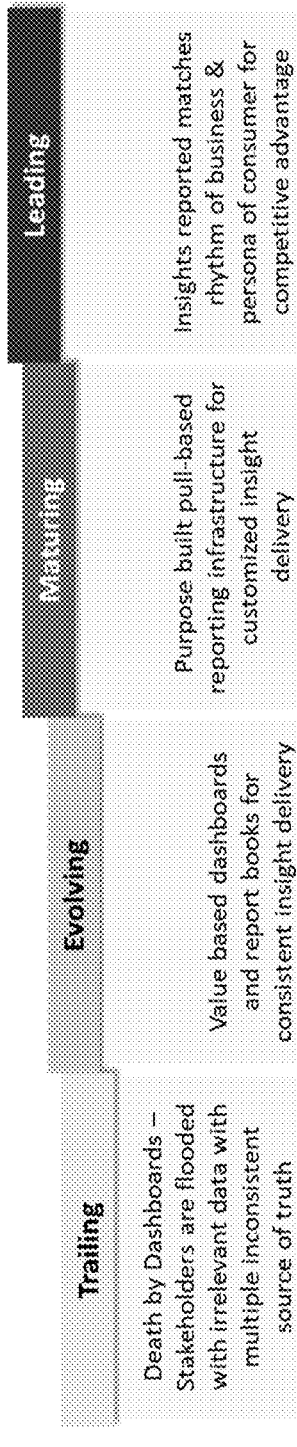

Referring to FIG. 6B, the maturity level of the insight-to-action loop 170 is also measured from the personalization aspect. In the embodiment illustrated in FIG. 6B, when the personalization related to the insight-to-action loop 170 is classified into the trailing level, it means that stockholders are flooded with irrelevant data with multiple inconsistent sources of truth. When the personalization related to the insight-to-action loop 170 is classified into the evolving level, it means that there are value-based dashboards and report books for consistent insight delivery. When personalization related to the insight-to-action loop 170 is classified into the maturing level, it means that there is a purposely built pull-based reporting (or self-service reporting) infrastructure for customized insight delivery. When the personalization related to the insight-to-action loop 170 is classified into the leading level, it means that insights reported match the rhythm of business & persona of consumer for competitive advantages.

In some embodiments, similar to the above-described measurements of the data maturity from different aspects, the measurement of the personalization-related maturity level can be also determined by using certain predefined rules, algorithms, or using certain machine learning models trained to determine the maturity level of the data-to-insight loop 170 from the personalization aspect. In one example, the insight-to-nudge engine 220 may have a predefined rule or algorithm that checks the delivery mode, delivery format, and timeline in insight delivery as well as the content consistency of the delivered insights, to determine the maturity level and/or specific value within a predefined range (e.g., 1-100). In some embodiments, a machine learning model may be also used to determine the maturity level or a specific maturity value or score for the insight-to-action loop 170 from the personalization aspect.

Figure 6C:
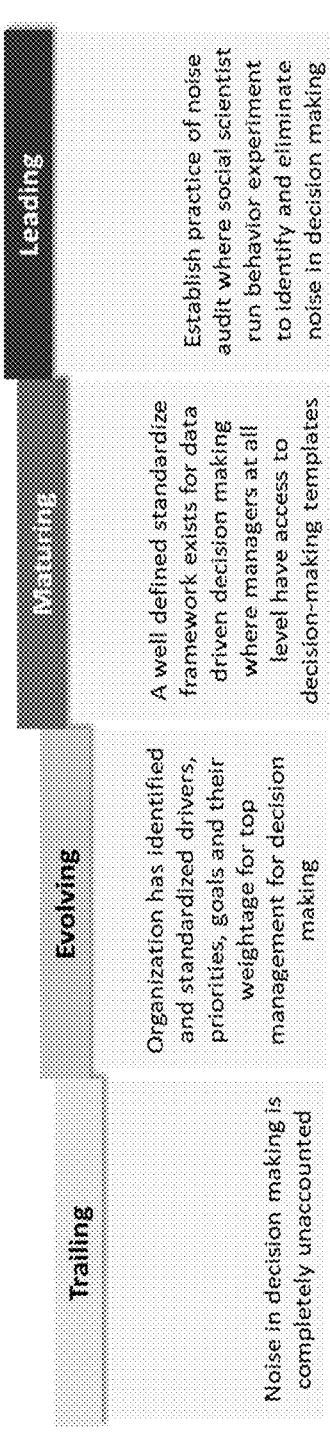

Referring to FIG. 6C, the maturity level of the insight-to-action loop 170 is further measured from the noise aspect. In the embodiment illustrated in FIG. 6C, when the noise related to the insight-to-action loop 170 is classified into the trailing level, it means that noise in the decision-making process is completely unaccounted for. When the noise related to the insight-to-action loop 170 is classified into the evolving level, it means that an organization has identified and standardized drivers, priorities, goals, and their weightage for decision making. When the noise related to the insight-to-action loop 170 is classified into the maturing level, it means that a well-defined and standardized framework exists for data-driven decision making, where managers at all levels have access to decision-making templates. When the noise related to the insight-to-action loop 170 is classified into the leading level, it means that there is an established practice of noise audit where social scientists run behavior experiments to identify and/or eliminate noise in a decision-making process.

In some embodiments, similar to the above-described measurements of the data maturity from different aspects, the measurement of the noise-related maturity level can be also determined by using certain predefined rules, algorithms, or using certain machine learning models trained to determine the maturity level of the data-to-insight loop 170 from the noise aspect. In one example, the insight-to-nudge engine 220 may have a predefined rule or algorithm that checks the framework standardization and noise control mechanisms, to determine the maturity level and/or specific maturity value or score within a predefined range (e.g., 1-100). In some embodiments, a machine learning model may be also used to determine the maturity level or a specific maturity value for the insight-to-action loop 170 from the noise aspect.

It is to be understood that the functions of the insight-to-nudge engine 220 are not limited to the above-described measurements of the maturity levels from different aspects. The functions of the insight-to-nudge engine 220 may additionally include providing directions to certain insight delivery tools or components to optimize the insight delivery modes, and to certain frameworks (e.g., to work around data restricted by privacy laws), and to further standardize certain procedures for noise control and elimination, so as to improve the maturity of the insight-to-action loop 170 to a level to allow achieving a zero insight-to-action cycle. In one example, if the insight-to-nudge engine 220 has detected that the personalization is at the evolving level, the insight-to-nudge engine 220 may send the instructions to a certain insight delivery tool to deliver insights that match the rhythm of business & persona of the consumer. In another example, if the insight-to-nudge engine 220 has detected the noise for the insight-to-action loop 170 is at the evolving level, the insight-to-nudge engine 220 may send the instructions to a certain framework to standardize certain procedures in a decision-making process, including using consistent prediction models or procedures in a decision-making process. In real applications, the insight-to-nudge engine 220 may include additional functions that improve the maturity of the insight-to-action loop 170, so as to achieve a zero insight-to-action loop, in which action can be instantly driven due to the highly relevant insights timely delivered.

In some embodiments, after determining the specific maturity values of the insight-to-action loop 170 from the insight type, personalization and noise aspects, a specific function may be used to evaluate the insight-to-action loop 170 in monitoring or evaluating the decision-making process. According to one embodiment, a function for such evaluation may be an insight type and personalization constrained by noise in the decision-making process, as shown in the equation below:

$$\text{Insight-to-Nudge Quotient} = i * \left( \frac{\text{Insight Type} + \text{Personalized}}{\text{Noise}} \right)$$

This value may be referred to as the insight-to-nudge quotient 540, which can be further used to calculate the eventual nudge quotient 240, as illustrated in FIG. 5.

As described earlier, besides the above-determined zero time-to-insight quotient and the insight-to-nudge quotient, another critical component of the disclosed decision-making evaluation and monitoring system (e.g., a zero-touch quotient and model) is the predictive model factor (D2A PMF) component 230. The D2A PMF is a specific value derived from running simulations on thousands of data-to-action cycles for various permutations of data-to-action cycle attributes, and is used to indicate the extent to which zero data-to-action cycle can be achieved within the given constraints of attributes. It denotes the incremental entitlement powered by the cognitive intelligence for a defined set of activities (e.g., a defined set of data-to-action loops).

To put the D2A PMF into consideration in evaluating a decision-making process, the relationship between the above-explained components can be identified through the study of thousands of data-to-action cycles in real-world scenarios augmented by machine learning models. In general, the training dataset contains a large number (e.g., hundreds, thousands, tens of thousands, etc.) of values/features/attributes of data-to-action cycles. This training dataset is applied to a machine learning process to generate learning values also known as prediction values. The training of the machine learning model begins with the creation of a training dataset and a test dataset. To create a training dataset, data-to-action cycles are analyzed by humans and labeled. This generally entails performing the action the machine learning module is expected to perform. Such labeled data is then divided into two sets, called a training dataset and a test dataset.

During the training phase, the data-to-action cycles dataset is supplied to a machine learning module under training, and outputs from that module are obtained. These outputs are compared against the labeled outputs and error signals for providing to the module under training, if the module outputs and labeled outputs are different. In response, the module may perform the necessary adjustments (e.g., through adjusting certain weights). The above-described process is repeated, and a new set of error signals are obtained. The previously supplied inputs may be supplied again, because the module outputs may be different due to the adjustments that have been made. The above process is iterated for a specified number of iterations or until the numbers and/or size of the errors fall below a specified threshold. At that point, the module is assumed to be trained sufficiently to move to the testing phase.

In the testing phase, a similar process as above is performed where inputs from the test dataset are provided to a module that is supposedly trained. Until this moment, the module has not processed inputs corresponding to the test dataset. The module's outputs are compared with the labeled outputs for the test dataset. If the errors or the differences between the module outputs and labeled outputs are small in number and/or size, and fall below a specified threshold, the module is determined to be fully trained. Otherwise, the module is retrained. Once the module is fully trained, the module may be used to determine the D2A PMF for a business to determine the extent to which zero data-to-action cycle can be achieved within the given constraints of attributes. The determined D2A PMF may be then input into an equation shown below for an evaluation of a decision-making process:

$$\text{Nudge Quotient} = \left\{ d * \left( \frac{\text{Type} * \text{Availability} * \text{Advancement}}{\text{Privacy} * \text{Bias}} \right) * i * \left( \frac{\text{Insight Type} + \text{Personalized}}{\text{Noise}} \right) \right\} * PMF$$

In some embodiments, a journey from nudge to action is monitored and accounted for through a feedback mechanism, so that a D2A loop score can be eventually determined (e.g., through zero time-to-action engine 250 in FIG. 2) based on the determined nudge quotient. For example, the nudge quotients can be calculated at department/function levels like sales, marketing, geography and product category levels (e.g., by taking multiple insights from these different levels). According to the framework or the evaluating or monitoring architecture disclosed herein, actions can be defined into three categories, namely, (1) no nudge at all (zero nudge action), (2) zero impact nudge, (3) action lead through nudge (conscious no action is also counted as action). A value is associated with a nudge/action categorized into each of the three categories. Accordingly, for the nudge derived from each insight, a category-based value is identified. A combined nudge score is then obtained, which can be further used to identify a data-to-action loop score by using the following equation:

$$\text{Data to Action (D2A Loop)} = \frac{\sum_{x=1}^{n} (\text{Nudge Quotient})^{Action}}{n}$$

The closer to zero the better the data-to-action loop is. The most effective teams and organizations will have a near-zero cycle of converting data into insight and insight being communicated in a way that it drives actions in real-time. The specific process for determining a D2A loop score is further described with reference to an exemplary method in FIG. 7.

Figure 7:
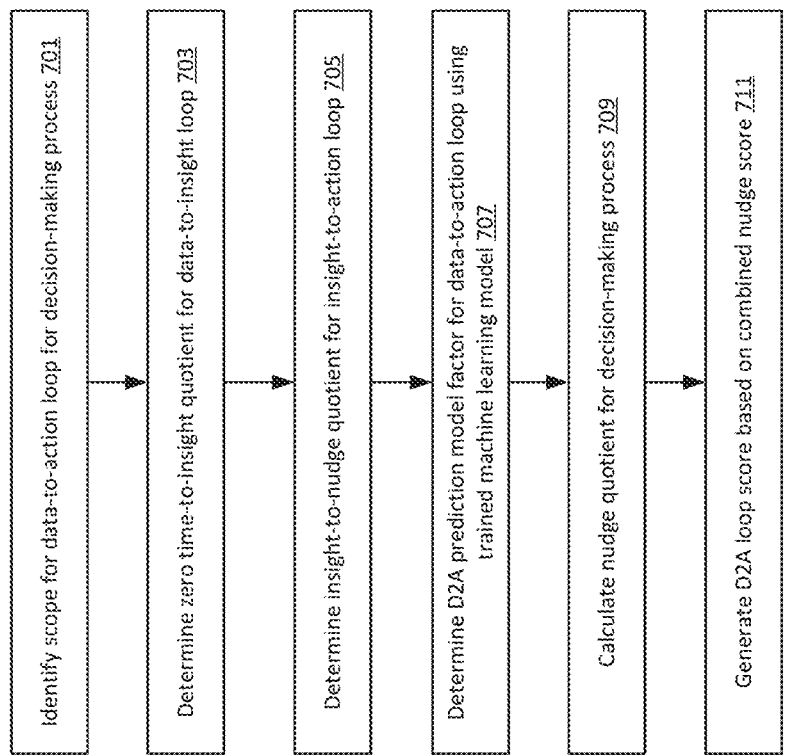
FIG. 7 illustrates a flow chart of an exemplary method for determining a data-to-action loop score, according to some embodiments.

FIG. 7 illustrates a flow chart of an exemplary method 700 for determining a data-to-action loop score, according to some embodiments. Method 700 may be performed by various components included in the disclosed decision-making evaluation and monitoring system 200, e.g., zero time-to-insight engine 210, insight-to-nudge engine 220, prediction model factor component 230, and zero data-to-action engine 250. In some embodiments, method 700 may include steps 701-713. It is to be appreciated that some of the steps may be optional. Further, some of the steps may be performed simultaneously, or in a different order than that shown in FIG. 7.

Step 701: Identify the scope for a data-to-action loop for a decision-making process.

As described earlier, a data-to-action loop or a decision-making process may be conducted for a large variety of different purposes. Different decision-making processes may require the identification of different datasets and/or analytical tools to be used in a decision-making process. Accordingly, by identifying the scope of a data-to-action loop, the disclosed decision-making evaluation and monitoring system 200 may determine the relevant data and prediction models as well as the delivery mode of the insights to be used in a decision-making process.

In some embodiments, scope identification for a data-to-action loop may include certain data-to-insight and insight-to-nudge mapping of the data-to-action iterations. This includes determining corresponding data components for a specific data-to-action loop from the data-to-action iterations.

Step 703: Determine a zero time-to-insight quotient for the data-to-insight loop.

In some embodiments, by accessing the maturity of the data components associated with the data-to-insight loop, the disclosed decision-making system 200 may determine the maturity levels and/or maturity values of the data components associated with the data-to-insight loop. For example, one or more machine learning-based models may be trained and used to determine a specific maturity value for each component (e.g., data type, data availability, data advancement, data privacy, and data bias). The determined maturity value may be between 1-100, depending on the maturity level identified for each component. Here, 1 is the lowest, and 100 is the highest ranking. For example, data type-related maturity may be assigned a value of 50 by the machine learning-based model(s). After determining the maturity value for each component, the zero time-to-insight quotient can be then calculated based on the determined maturity values.

Step 705: Determine an insight-to-nudge quotient for the insight-to-action loop.

The insight-to-nudge quotient may be calculated similarly to the calculation of the zero time-to-insight quotient. For example, each of the data components (e.g., insight type, personalization, and noise) associated with the insight-to-action loop may be assigned a value by a machine learning model. The insight-to-nudge quotient is then calculated based on the values assigned to the data components associated with the insight-to-action loop.

Step 707: Determine the D2A PMF for the data-to-action loop using a trained machine learning model.

The D2A PMF may denote the incremental entitlement powered by cognitive intelligence for a defined set of activities. According to one embodiment, the D2A PMF may be determined by a machine learning-based model that is trained based on running simulations on thousands of data-to-action cycles for various permutations of data-to-action cycle attributes. The determined D2A PMF may indicate an extent to which zero data-to-action can be achieved within the given constraints of the attributes associated with the data-to-action loop.

Step 709: Calculate a nudge quotient for the data-to-action loop.

According to one embodiment, the nudge quotient may be calculated based on the determined zero time-to-insight quotient, the insight-to-nudge quotient and the D2A PMF. In one example, the nudge quotient is a multiplier of the zero time-to-insight quotient, the insight-to-nudge quotient and the determined D2A PMF.

Step 711: Generate a D2A loop score based on a combined nudge score.

As previously described, a journey from nudge to action can be also monitored and accounted for through a feedback mechanism, so that a D2A loop score can be generated. For instance, for a particular action to be taken, multiple inputs/insights can be considered. Nudge(s) derived from each insight can be categorized into one of the three categories, namely (1) zero nudge action, (2) zero impact nudge, (3) action lead through nudge (conscious no action is also counted as action). As the value associated with each category is identified for each nudge, a combined nudge score can be obtained. A combined D2A score is then generated based on the combined nudge score.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated and described in the figures above. Modules may constitute either software modules (e.g., code embodied on a machine-readable medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field-programmable gate array (FPGA) or an application-specific integrated circuit (ASIC)) to perform certain operations. A hardware module may also include programmable logic or circuitry (e.g., as encompassed within a general-purpose processor or other programmable processors) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APis).)

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that includes a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" is employed to describe elements and components of the embodiments herein. This is done merely for convenience and to give a general sense of the claimed invention. This description should be read to include one or at least one and the singular also includes the plural unless it is obvious that it is meant otherwise.

Upon reading this disclosure, those of skill in the art will appreciate still additional alternative structural and functional designs for the system described above. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A system for driving zero time-to-insight and effectiveness of insight-to-nudge in a decision-making process, comprising:
   a processor; and
   a memory, coupled to the processor, configured to store executable instructions that, when executed by the processor, cause the processor to:
   identify a scope associated with a data-to-action loop in the decision-making process;
   determine, by a zero time-to-insight engine, a zero time-to-insight quotient for a data-to-insight loop included in the data-to-action loop;
   determine, by an insight-to-nudge engine, an insight-to-nudge quotient for an insight-to-action loop included in the data-to-action loop;
   determine, by a predictive model factor component, a data-to-action prediction model factor (D2A PMF) for the data-to-action loop, the D2A PMF quantifying an incremental zero time-to-insight potential for the data-to-action loop and corresponding attributes, wherein the predictive model factor component comprises a predictive machine learning model trained by:
   running simulations on a plurality of data-to-action cycles for various permutations of data-to-action cycle attributes;
   dividing the simulations and data-to-action cycles in real-world scenarios into a training set and a testing set; and
   training and testing the predictive machine learning model based on the training set and the testing set, wherein training the predictive machine learning model includes one or more additional training steps when differences between outputs from the testing of the predictive machine learning model and labeled outputs exceed a specified threshold;
   generate a nudge quotient for the data-to-action loop based on the zero time-to-insight quotient, the insight-to-nudge quotient, and the D2A PMF; and
   dynamically adjust a data collection process to at least improve data privacy based on the generated nudge quotient.

2. The system of claim 1, wherein, prior to determining the zero time-to-insight quotient and the insight-to-nudge quotient, the instructions when executed by the processor further cause the processor to:
   map data collected from data-to-action interactions to the data-to-action loop in the decision-making process.

3. The system of claim 2, wherein the maturity value for each of the first set of data components is determined by using a machine learning model.

4. The system of claim 2, wherein the first set of data components comprise one or more of a data type, a data availability, a data advancement, a data privacy, or a data bias associated with the insight-to-action loop.

5. The system of claim 4, wherein a maturity value of the data type, data availability or data advancement has a proportionate and positive relationship to the zero time-to-insight quotient, and a maturity value of the data privacy or data bias has an inverse relationship to the zero time-to-insight quotient.

6. The system of claim 2, wherein the instructions when executed by the processor further cause the processor to determine a maturity level for each of the first set of data components.

7. The system of claim 6, wherein the maturity level is one of a trailing level, evolving level, maturing level, or leading level.

8. The system of claim 1, wherein, to determine the zero time-to-insight quotient for the data-to-insight loop, the instructions when executed by the processor further cause the processor to:
   determine a first set of data components included in the data-to-insight loop;
   allocate a maturity value for each of the first set of data components; and
   determine the zero time-to-insight quotient for the data-to-insight loop based on the maturity value for each of the first set of data components.

9. The system of claim 8, wherein the second set of data components comprises one or more of an insight type, personalization or a noise associated with the insight-to-action loop.

10. The system of claim 9, wherein the personalization is a combination of irrelevance of insights generated from the data-to-insight loop and mode of delivery of the generated insights.

11. The system of claim 9, wherein a maturity value of the insight type or personalization has a proportionate and positive relationship to the insight-to-nudge quotient, and a maturity value of the noise has an inverse relationship to the insight-to-nudge quotient.

12. The system of claim 1, wherein, to determine the insight-to-nudge quotient for the insight-to-action loop, the instructions when executed by the processor further cause the processor to:
  determine a second set of data components included in the insight-to-action loop;
  allocate a maturity value for each of the second set of data components; and
  determine the insight-to-nudge quotient for the insight-to-action loop based on the maturity value for each of the second set of data components.

13. The system of claim 1, wherein the instructions when executed by the processor further cause the processor to:
  determine a plurality of nudge quotients for different units inside an organization;
  generate a combined nudge score based on the plurality of nudge quotients; and
  generate a D2A loop score based on the combined nudge score.

14. The system of claim 1, wherein the instructions when executed by the processor further cause the processor to:
  implement a zero time-to-insight and insight-to-nudge quotient aggregation mechanism across a plurality of data-to-action cycles, to drive a zero time-to-insight of the decision-making process.

15. The system of claim 14, wherein, to implement the zero time-to-insight and insight-to-nudge quotient aggregation mechanism, the instructions when executed by the processor further cause the processor to:
  monitor the data-to-action loop to drive the zero time-to-insight.

16. The system of claim 1, wherein the instructions when executed by the processor further cause the processor to:
  terminate the decision-making process when the determined zero time-to-insight quotient is below a predefined threshold.

17. A computer-implemented method for driving zero time-to-insight and effectiveness of insight-to-nudge in a decision-making process, the method comprising:
  identifying a scope associated with a data-to-action loop in the decision-making process;
  determining, by a zero time-to-insight engine, a zero time-to-insight quotient for a data-to-insight loop included in the data-to-action loop;
  determining, by an insight-to-nudge engine, an insight-to-nudge quotient for an insight-to-action loop included in the data-to-action loop;
  determining, by a predictive model factor component, a data-to-action prediction model factor (D2A PMF) for the data-to-action loop, the D2A PMF quantifying an incremental zero time-to-insight potential for the data-to-action loop and corresponding attributes, wherein the predictive model factor component comprises a predictive machine learning model trained by:
    running simulations on a plurality of data-to-action cycles for various permutations of data-to-action cycle attributes;
    dividing the simulations and data-to-action cycles in real-world scenarios into a training set and a testing set; and
    training and testing the predictive machine learning model based on the training set and the testing set
    wherein training the predictive machine learning model includes one or more additional training steps when differences between outputs from the testing of the predictive machine learning model and labeled outputs exceed a specified threshold;
  generating a nudge quotient for the data-to-action loop based on the zero time-to-insight quotient, the insight-to-nudge quotient, and the D2A PMF; and
  dynamically adjusting a data collection process to at least improve data privacy based on the generated nudge quotient.

18. A computer program product for driving zero time-to-insight and effectiveness of insight-to-nudge in a decision-making process, the computer program product comprising a non-transitory computer-readable medium having computer-readable program code stored thereon, the computer-readable program code configured to:
  identify a scope associated with a data-to-action loop in the decision-making process;
  determine, by a zero time-to-insight engine, a zero time-to-insight quotient for a data-to-insight loop included in the data-to-action loop;
  determine, by an insight-to-nudge engine, an insight-to-nudge quotient for an insight-to-action loop included in the data-to-action loop;
  determine, by a predictive model factor component, a data-to-action prediction model factor (D2A PMF) for the data-to-action loop, the D2A PMF quantifying an incremental zero time-to-insight potential for the data-to-action loop and corresponding attributes, wherein the predictive model factor component comprises a predictive machine learning model trained by:
    running simulations on a plurality of data-to-action cycles for various permutations of data-to-action cycle attributes;
    dividing the simulations and data-to-action cycles in real-world scenarios into a training set and a testing set; and
    training and testing the predictive machine learning model based on the training set and the testing set
    wherein training the predictive machine learning model includes a retraining process when differences between outputs from the testing of the predictive machine learning model and labeled outputs are fall above a specified threshold;
  generate a nudge quotient for the data-to-action loop based on the zero time-to-insight quotient, the insight-to-nudge quotient, and the D2A PMF; and
  dynamically adjust a data collection process to at least improve data privacy based on the generated nudge quotient.

* * * * *